United States Patent Office 3,307,544
Patented Mar. 7, 1967

3,307,544
SURGICAL PRESSURE-SENSITIVE ADHESIVE SHEET WITH N-TERT-BUTYLACRYLAMIDE COPOLYMER ADHESIVE
Robert J. Gander, Whitehouse, N.J., and Harold P. Brown, Akron, Ohio, assignors to Johnson & Johnson, a corporation of New Jersey and The B. F. Goodrich Company, a corporation of Ohio
No Drawing. Filed Sept. 10, 1963, Ser. No. 307,814
7 Claims. (Cl. 128—156)

The present invention relates to adhesive-coated sheet material and more particularly to surgical pressure-sensitive, adhesive-coated products that are adapted to be secured to the human skin.

It has heretofore been proposed to use as the pressure-sensitive adhesive coating of adhesive tapes the polymers of alcohol esters of acrylic acid or the copolymers of these esters either with each other or with additive copolymerizable monomers having strongly polar groups. However, many of these adhesive masses, even though apparently suitable for industrial purposes, are found not to be satisfactory when used as the pressure-sensitive adhesive coating on adhesive-coated surgical products, such, for example, as adhesive tapes, adhesive bandages, adhesive plasters, adhesive-coated surgical operating sheets, corn pads and the like.

Although many acrylates can be used as pressure-sensitive adhesives and are found to have excellent tack and adherence to many different types of surfaces, it has been found that when adhered to a person's skin the adhesion to the skin lessens substantially over a period of time, in many instances the adhesion after about 24 hours being so poor that an adhesive tape prepared wtih such acrylate pressure-sensitive adhesive would fall off the skin of a patient. The term "pressure-sensitive surgical adhesive" is accordingly used herein to distinguish over adhesives not generally suitable for application to the skin and refers to pressure-sensitive adhesives that are adapted to be used in contact with the human skin.

"Surgical pressure-sensitive adhesive sheet products," as the term is herein used, includes any product having a flexible backing and a pressure-sensitive adhesive coating thereon that is adapted to be applied to the human skin and includes, although it is not limited thereto, such products as adhesive tapes, adhesive bandages, adhesive plasters, adhesive-coated surgical operating sheets, corn pads and the like.

It has now been discovered that surgical pressure-sensitive adhesive sheet products having excellent skin adhesion are obtained if a flexible backing sheet is coated with certain acrylate polymers hereinafter more fully described.

The acrylate copolymers used as the pressure-sensitive adhesive in preparing the surgical pressure-sensitive adhesive sheet products of the present invention are copolymers of alkyl acrylates having at least six carbon atoms in an alkyl group and N-tert.-butylacrylamide.

Some illustrative examples of suitable alkyl acrylate monomers are 2-ethylhexyl acrylate, and the heptyl, octyl, nonyl and decyl acrylates. The preferred alkyl acrylate monomer is 2-ethylhexyl acrylate.

In making the pressure, sensitive adhesives of the present invention, the monomers are preferably copolymerized in proportions of about 65 to 85 parts by weight of the alkyl acrylate and 35 to 15 parts by weight of the N-tert.-butylacrylamide. The copolymerization is carried to a point where the resulting copolymer, when freed of solvent, has a Williams plasticity within the range of 1.3 to 3.0 mm.

The preferred adhesives are prepared by copolymerizing from about 70 to 75 parts by weight of 2-ethylhexyl acrylate with about 30 to 25 parts by weight of the N-tert.-butylacrylamide. The copolymerization is preferably carried out in a solvent medium and, as previously indicated, to where the copolymer has a Williams plasticity within the range of about 1.3 to 3.0 mm.

"Williams plasticity," as the term is herein used, is a plasticity measurement common in the field of plastics. The numerical value or values given as the Williams plasticity are the height in millimeters of a 2.0 gram spherical pellet after being placed under a compression load of 5 kilograms for 14 minutes at a temperature of 100° F.

The superiority of pressure-sensitive adhesive tapes using these copolymers as the adhesive mass, as compared to tapes having pressure-sensitive adhesive coatings formed of equally tacky acrylate polymers and copolymers where the tape is adapted to be used in contact with the human skin, is well illustrated by the following table:

| Acrylate Polymer | Williams Plasticity, mm. | Tack Rating | Skin Adherence, Percent | | |
|---|---|---|---|---|---|
| | | | 24 hrs. | 48 hrs. | 72 hrs. |
| NON-WOVEN FABRIC—POLYETHYLENE FILM LAMINATE BACKING | | | | | |
| 75% 2-ethylhexyl acrylate, 25% N-tert.-butylacrylamide. | 1.78 | Good | 90 | 89 | 88 |
| 70% 2-ethylhexyl acrylate, 30% N-tert.-butylacrylamide. | 2.42 | do | 89 | 86 | 84 |
| 60% 2-ethylhexyl acrylate, 40% methyl acrylate. | 1.78 | do | 74 | 62 | 47 |
| 3.5-MIL POLYETHYLENE FILM BACKING | | | | | |
| 75% 2-ethylhexyl acrylate, 25% N-tert.-butylacrylamide. | 1.42 | Good | 90 | 86 | 78 |
| 75% n-butyl acrylate, 25% N-tert.-butylacrylamide. | 1.51 | do | 67 | 42 | 36 |
| 50% n-butyl acrylate, 50% t-butyl acrylate | 1.74 | do | 66 | 42 | 25 |
| 70% n-butyl acrylate, 5% acrylic acid/20% methyl acrylate, 5% methacrylic acid. | 1.07 | do | 63 | 38 | 21 |
| 25% 2-ethylhexyl acrylate, 5% acrylic acid/65% methyl acrylate, 5% methacrylic acid. | 1.46 | do | 38 | 13 | 2 |
| 86.26% 2-butoxyethyl acrylate, 6.87% acrylic acid, 6.87% methacrylic acid. | 1.04 | do | 51 | | 25 |

In obtaining the test results which form the basis for the above table, the acrylate pressure-sensitive adhesive masses are spread on the respective backings with a knife coater to give a 1 mil thickness of dry mass.

The non-woven fabric polyethylene film laminate backing is formed of a flexible polyethylene film, 1 mil in thickness, heat laminated to a cellulosic non-woven fabric sheet. The pressure-sensitive adhesive is spread on the non-woven fabric side of the laminate.

The 3.5 mil polyethylene film backing is formed from a 3.5 mil polyethylene sheet which has been chemically treated on one side to provide an oxidized, polar surface for improved anchorage of the adhesive to the polyethylene sheet. The pressure-sensitive adhesive is spread on this oxidized polar surface.

The pressure-sensitive acrylate mass is applied in each case by spreading from a solvent solution of the acrylate copolymer in the solvent in which the acrylate has been formed. The solvent is then evaporated to leave the tacky acrylate deposited in a thin film on the backing. In each case, the backing and adhesive mass are perforated to minimize maceration.

The initial tack or quick-stick of the pressure-sensitive acrylate is determined in each case by the conventional thumb test method in which the thumb of the tester is pressed lightly against the adhesive-coated surface of the tape and then removed. Although the results of such a test are not reducible to numerical evaluation, the thumb test has been found to be generally reliable for determining the relative order of tackiness of different pressure-sensitive adhesives and is commonly used in the pressure-sensitive adhesive industry.

Skin adherence values are determined by actual wearing tests and are average statistical values. The tests are carried out by placing 2 x 2 inch squares of the pressure-sensitive, adhesive-coated material on the backs of 25 human subjects. The subjects then wear the squares of tape for periods up to 7 days, the tapes being periodically checked for adherence at 24-hour intervals.

The following example further illustrates the practice of the invention. The example, however, is given for the purpose of illustration only and the invention is not limited thereto.

*Example*

The polymerizations are carried out in a conventional polymerization reactor fitted with reflux condenser and mechanical stirrer. To the reactor is added 112.5 parts by weight of 2-ethylhexyl acrylate, 37.5 parts by weight of N-tert.-butylacrylamide and 150 parts by weight of Reagent Grade ethyl acetate. This is a monomer charge of 75% by weight of 2-ethylhexyl acrylate and 25% by weight of N-tert.-butylacrylamide.

During the first 20 minutes of the reaction, the contents of the reaction are heated to a temperature of 80° C., with stirring, while being swept with a slow stream of nitrogen to displace the oxygen in the reaction. The solid N-tert.-butylacrylamide dissolves as the solution is warmed.

The nitrogen is then turned off and 0.75 part by weight of benzoyl peroxide are added. An initial vigorous polymerization ensues, causing the ethyl acetate to reflux. Stirring and heating at 80° C. are continued for 4 hours. Just before the end of the 4-hour period, the reaction mixture is diluted with 76 parts by weight of ethyl acetate, giving a solution of 40% solids content.

A portion of the copolymer is recovered from the solution by evaporating the ethyl acetate. The copolymer is a colorless, sticky solid having a Williams plasticity of 1.78 mm.

The intrinsic viscosity of the copolymer is 1.16 deciliters per gram measured in toluene at 30° C.

In a similar fashion, other copolymers having different ratios of 2-ethylhexyl acrylate to N-tert.-butylacrylamide are prepared. Properties of various copolymers are summarized in the following table:

| 2-ethylhexyl acrylate, percent | N-tert.-butyl-acrylamide, percent | Williams Plasticity, mm. | Intrinsic Vis., dl./g. | Remarks |
| --- | --- | --- | --- | --- |
| 80 | 20 | 1.30 | ---------- | Good skin adhesion but slightly stringy as removed. |
| 75 | 25 | 1.78 | 1.16 | Good skin adhesion. No tendency to string as removed. |
| 70 | 30 | 2.42 | 1.25 | Good skin adhesion. No tendency to string as removed. |
| 65 | 35 | 3.16 | ---------- | Poor skin adhesion. |

Solutions of these copolymers with solids contents of 35–40% have viscosities suitable for spreading. The solutions are spread on swatches of backing material by means of a doctor blade, although any conventional manner of spreading may be used. Where a doctor blade is used, the gap between the backing and the doctor blade is preferably set to deposit a coating of pressure-sensitive adhesives which after drying will have a thickness of about 1 mil. The backing, with the freshly spread adhesive solution, is then dried in a circulating air oven at temperatures of about 200–250° F. to evaporate the solvent.

Surgical pressure-sensitive adhesive-coated sheet products made in accordance with the present invention have excellent initial tack and excellent long-term adherence to skin. Particularly with products made in the preferred manner of practicing the present invention, excellent skin adhesion is obtained even after 72 hours of continuous wear. Despite this excellent adhesion, surgical pressure-sensitive adhesive-coated sheet products of the present invention remove readily and cleanly from the patient's skin.

The invention is susceptible of many modifications within its spirit and accordingly is to be limited only by the scope of the appended claims.

Having thus described our invention, we claim:

1. A surgical pressure-sensitive, adhesive-coated sheet comprising a flexible backing member having a pressure-sensitive adhesive consisting essentially of a copolymer of about 65 to 85 parts by weight of an alkyl acrylate having an alkyl group of at least six carbon atoms and 35 to 15 parts by weight N-tert.-butylacrylamide, said copolymer having a Williams plasticity of about 1.3 to 3.0 mm.

2. A surgical pressure-sensitive, adhesive-coated sheet of claim 1 in which said alkyl acrylate has an alkyl group of six to ten carbon atoms.

3. A surgical pressure-sensitive, adhesive-coated sheet of claim 2 in which said alkyl acrylate is 2-ethylhexyl acrylate.

4. A surgical pressure-sensitive adhesive sheet comprising a flexible backing member having a pressure-sensitive adhesive coating consisting essentially of a solvent-polymerized copolymer of about 65 to 85 parts by weight 2-ethylhexyl acrylate and 35 to 15 parts by weight N-tert.-butylacrylamide, said copolymer having a Williams plasticity of 1.3 to 3.0 mm.

5. A surgical pressure-sensitive adhesive sheet comprising a flexible backing member having a pressure-sensitive adhesive coating consisting essentially of a copolymer of about 70 to 75 parts by weight 2-ethylhexyl acrylate and 30 to 25 parts by weight N-tert.-butylacrylamide, said copolymer having a Williams plasticity of 1.3 to 3.0 mm.

6. A surgical pressure-sensitive adhesive sheet comprising a flexible film backing having on one side thereof a pressure-sensitive coating consisting essentially of a solvent-polymerized copolymer of about 70 to 75 parts by weight 2-ethylhexyl acrylate and 30 to 25 parts by weight N-tert.-butylacrylamide, said copolymer having a Williams plasticity of 1.3 to 3.0 mm.

7. A surgical pressure-sensitive sheet of claim 1 in which said backing is a polyethylene film.

References Cited by the Examiner

UNITED STATES PATENTS

| | | | |
|---|---|---|---|
| Re. 24,906 | 12/1960 | Ulrich | 117—122 X |
| 2,586,587 | 2/1952 | Wendt | 18—57 |
| 2,748,029 | 5/1956 | Spear et al. | 117—155 |
| 2,798,868 | 7/1957 | Miller | 260—85.5 |
| 2,837,501 | 6/1958 | Millhiser | 260—79.3 |
| 2,949,443 | 8/1960 | Merriam et al. | 128—156 X |
| 3,037,963 | 6/1962 | Christenson | 260—72 |
| 3,085,572 | 4/1963 | Blackford | 128—156 |
| 3,189,581 | 6/1965 | Hart et al. | 117—122 X |

WILLIAM D. MARTIN, *Primary Examiner.*

W. D. HERRICK, *Assistant Examiner.*